(12) United States Patent
Takano

(10) Patent No.: US 6,707,294 B2
(45) Date of Patent: Mar. 16, 2004

(54) METHOD AND PROGRAM FOR CALCULATING REPRODUCTION TRACK WIDTH OF MAGNETORESISTIVE EFFECT HEAD

(75) Inventor: Ken-ichi Takano, Tokyo (JP)

(73) Assignee: TDK Corporation, Tokyo (JP)

( * ) Notice: Subject to any disclaimer, the term of this patent is extended or adjusted under 35 U.S.C. 154(b) by 21 days.

(21) Appl. No.: 10/173,832

(22) Filed: Jun. 19, 2002

(65) Prior Publication Data

US 2003/0011361 A1 Jan. 16, 2003

(30) Foreign Application Priority Data

Jun. 21, 2001 (JP) ........................................ 2001-188097

(51) Int. Cl.$^7$ ............................ G01R 33/12; G11B 5/39
(52) U.S. Cl. .................................... 324/210; 29/603.09
(58) Field of Search ................................ 324/210, 211, 324/212, 252; 360/77.07, 75; 714/718; 702/115; 29/603.09

(56) References Cited

U.S. PATENT DOCUMENTS 5,898,549 A * 4/1999 Gill ........................ 360/324.11
6,400,535 B1 * 6/2002 Shimazawa et al. ... 360/324.11

OTHER PUBLICATIONS

Ching Tsang, et al., IEEE Trans. Magn., vol. 30, No. 6, pp. 3801 to 3806 (1994).
Yoshio Suzuki, et al., IEEE Trans. Magn., vol. 34, No. 4, pp. 1513 (1998).
Yoshinobu Nakatani, et al., Japanese Journal of Applied Physics, vol. 28, pp. 2485 to 2507 (1989).
Ken–ichi Takano, et al., IEEE Trans. Magn., vol. 34, No. 4, pp. 1516 to 1518 (1998).

* cited by examiner

*Primary Examiner*—N. Le
*Assistant Examiner*—Reena Aurora
(74) *Attorney, Agent, or Firm*—Armstrong, Kratz, Quintos, Hanson & Brooks, LLP

(57) ABSTRACT

A method and computer program to calculate a reproduction track width of a MR head. This method begins by subdividing the magnetic domain control layer of a MR element and lead conductors into several polyhedral elements. Thereafter, electric potentials are calculated for each of the polyhedral elements based on the resistance at each layer. A current density is determined for each of the polyhedral elements based on the calculated electric potentials. The current densities are integrated to calculate an initial resistance value. Further, the resistance of a local block is changed by a predetermined amount. The electric potential is calculated for each of the polyhedral elements, current density is acquired, and the acquired current densities is calculated to determine a resistance value. Finally, the reproduction track width is obtained based on the initial acquired resistance value and the acquired resistance value.

7 Claims, 11 Drawing Sheets

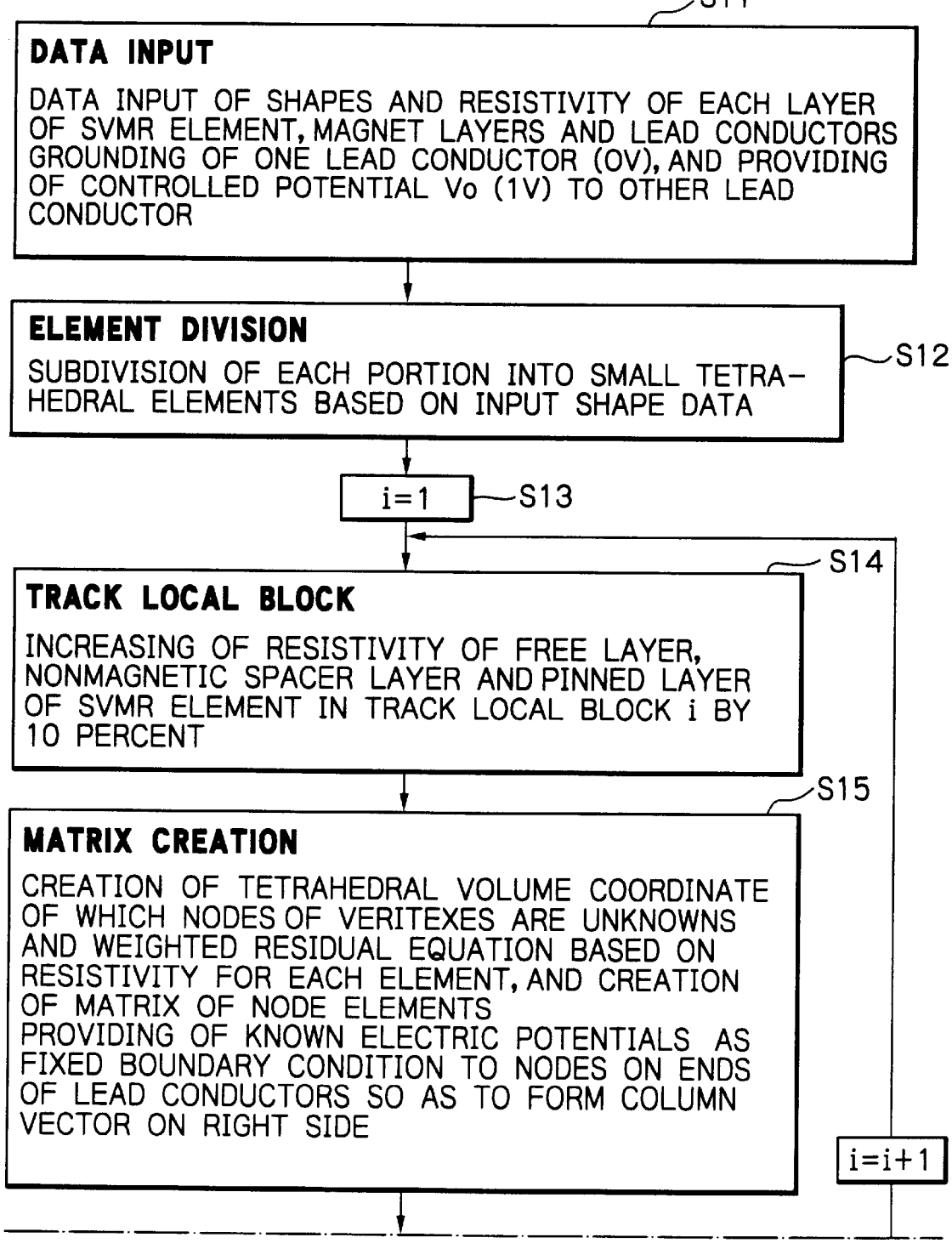

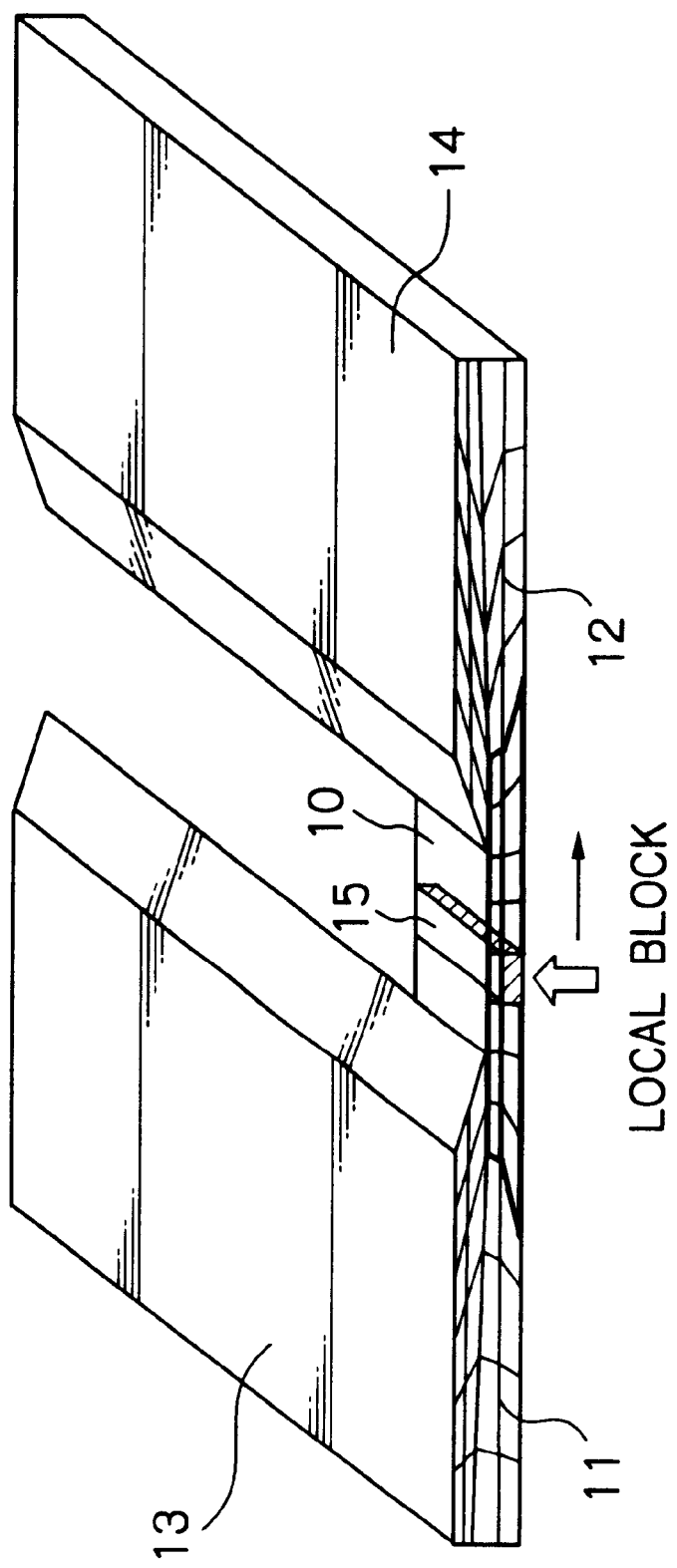

METHOD AND PROGRAM FOR CALCULATING REPRODUCTION TRACK WIDTH OF MAGNETORESISTIVE EFFECT HEAD

FIELD OF THE INVENTION

The present invention relates to a method for calculating a reproduction track width of a magnetoresistive effect (MR) head and a program for calculating a reproduction track width of an MR head.

DESCRIPTION OF THE RELATED ART

In recent years, networking of information is rapidly underway along with widespread use of personal computers. Thus, information handled includes not only conventional numeric data but also image data and so on, so that the amount of the information is dramatically increasing. In order to handle such an enormous amount of the information, a hard disk system that is high-speed, large-capacity and highly reliable is required along with a high-speed MPU.

In order to reproduce a magnetic signal recorded on a hard disk, anisotropic magnetoresistive effect heads (AMR heads) utilizing an anomalous magnetoresistive effect of a ferromagnetic material due to so-called spin-orbit interaction wherein electric resistance of a ferromagnetic thin-film layer changes depending upon an electric field are typically used.

In the AMR head, NiFe, NiFeCo, FeCo or NiCo thin film is generally used as a magneto-sensitive element. However, a magnetoresistive change rate (MR change rate) acquired is up to about two to three percent even if the NiFe thin film that has an excellent soft magnetic characteristic. For this reason, an MR head with a higher MR change rate has been demanded.

In recent years, giant magnetoresistive effect (GMR) elements such as so-called spin-valve (SV) MR elements have been proposed (for example, IEEE Trans. Magn., Vol. 30, No. 6, pp. 3801 to 3806 (1994)). In the SVMR element, a nonmagnetic conductive spacer layer is sandwiched by two ferromagnetic layers, one of the ferromagnetic layers (pinned layer) has its magnetization direction pinned by an exchange bias of an anti-ferromagnetic layer, and the other ferromagnetic layer (free layer) changes due to magnetization in an external magnetic field so as to have great change in resistance generated by an angle difference between the magnetization directions of the two ferromagnetic layers. The application of such SVMR element to a magnetic head has already been started.

In general, the magnetization direction of an MR film in the AMR head or the magnetization direction of the free layer in the SVMR head is controlled by a magnetic domain control layer to keep in a single magnetic domain state. Such magnetic domain control layer consists of magnet layers placed on both track ends of the MR film or the free layer or soft magnetic layers magnetically pinned with anti-ferromagnetic layers placed on both track ends of the MR film or the free layer, or of anti-ferromagnetic layers directly or indirectly exchange-coupled or magneto-statically coupled with the MR film or the free layer, and controls the magnetization direction in the MR film or the free layer by providing magnetic fields so as to cancel anti-magnetic fields at its track end regions. Normally, lead conductors are formed on the magnet layers or the anti-ferromagnetic layers.

A physical track width (optical track width) of the AMR head and the SVMR head (hereinafter referred to as MR heads) with such structure is defined as a space between the lead conductors on both sides of the element, a space between the magnet layers, an upside width of the element, a downside width of the element or a middle width of the element, a width of the MR film or the free layer, a width of the nonmagnetic spacer layer, a width of the pinned layer or an average width thereof.

However, the recent MR heads adopt a lead-overlaid structure wherein the lead conductors are laminated by overlapping on the MR elements, and therefore a track width contributing to actual reproduction (magnetic track width) is sometimes different from the physical track width. In such cases, it is necessary, for the sake of obtaining the actual or substantial track width, to make a measurement by reading magnetic information on thin magnetic tracks formed on the magnetic disk while moving the actually fabricated MR heads. Accordingly, it was not possible to know the substantial track width on paper or before fabricating final magnetic heads, which has been a serious problem in designing and manufacturing the MR heads.

SUMMARY OF THE INVENTION

It is therefore an object of the present invention to provide a method and a program for calculating a reproduction track width of an MR head, whereby a substantial track width of the MR head can be calculated with high accuracy and on paper.

According to the present invention, a method of calculating reproduction track width of an MR head includes a first step of subdividing at least one layer of an MR element, magnetic domain control layers of the MR element and lead conductors connected to the MR element into a plurality of polyhedral elements, based on at least data representing a shape of the at least one layer, data representing a shape of the magnetic domain control layers and data representing a shape of the lead conductors, a second step of calculating electric potentials at nodes or edges of each of the polyhedral elements at least based on resistivities of the at least one layer, the magnetic domain control layers and the lead conductors, acquiring a current density of each of the polyhedral elements based on the calculated electric potentials at the nodes or the edges, and integrating the acquired current densities to calculate an initial resistance value between terminals of the lead conductors, a third step of, in a state where a resistivity of a local block of the MR element is changed by a predetermined amount, calculating electric potentials at nodes or the edges of each of the polyhedral elements, acquiring a current density of each of the polyhedral elements based on the calculated electric potentials at the nodes or the edges, and integrating the acquired current densities to calculate a resistance value between the terminals of the lead conductors, the third step being repeated by shifting the local block with a resistivity changed by the predetermined amount, in a track width direction of the MR element, and a fourth step of obtaining a reproduction track width from the acquired initial resistance value and the acquired resistance value.

The substantial reproduction track width of the MR head is determined by the following three factors:

(a) Embedding of medium magnetic field,
(b) Sensitivity distribution of an MR film or a free layer, and
(c) Electrical reproduction track width.

The factor (a) can be easily calculated by a technique of developing a Green function in Fourier series (IEEE Trans. Magn., Vol. 34, No. 4, 1513, (1998)), and a finite element method and so on. The factor (b) can also be acquired by calculating how it is magnetized (micromagnetic simulation) according to an effective magnetic field (sum of a static magnetic field, an anisotropic magnetic field, an exchanged magnetic field and an external magnetic field) and Landau-Lifshitz-Gilbert equation (Jpn. J. Appl. Phys., 28, pp. 2485 to 2507, 1989) (IEEE Trans. Magn., Vol. 34, No. 4, pp. 1516 to 1518, (1998)). On the other hand, the factor (c) of electrical reproduction track width could not be easily acquired by a prior art, but it can now be easily calculated according to the present invention.

To be more specific, according to the present invention, each of the layer of the MR element, the magnetic domain control layers and the lead conductors is subdivided into a plurality of polyhedral elements based on the data representing the shape of the layer of the MR element itself, the data representing the shape of the magnetic domain control layers and the data representing the shape of the lead conductors. Then, electric potentials at the nodes or the edges of each polyhedral element are calculated based on the resistivity of each of these layers, and the current density of each polyhedral element is acquired from the calculated electric potentials. Then, the acquired current densities are integrated to calculate an initial resistance value between the terminals of the lead conductors. On the other hand, in the state where the resistivity in the local blocks of the MR element is changed by a predetermined amount, the electric potentials at the nodes or the edges of each polyhedral element are calculated, the current density of each polyhedral element is acquired from the calculated electric potentials, and the acquired current densities are integrated to calculate a resistance value between the terminals of the lead conductors. The local blocks are sequentially shifted in a track width direction of the MR element so as to repeatedly perform the above-mentioned calculation for calculating the resistance value, and the electrical reproduction track width is acquired from the acquired initial resistance value and resistance value. As the electrical reproduction track width of the MR head can be acquired with high accuracy, the substantial track width thereof can also be calculated with high accuracy and on paper.

It is preferred that the second step includes a step of assuming electric potentials on the nodes or the edges of each of the polyhedral elements as unknowns, a step of creating a matrix of a finite element method on the nodes or the edges in accordance with a weighted residual equation based on a polyhedral element volume coordinate and a resistivity of each of the polyhedral elements, a step of creating a column vector by providing a fixed boundary condition to upper surfaces of the lead conductors, and a step of solving equations of the matrix and the column vector to calculate the electric potential at each node or edge.

It is also preferred that the second step further includes a step of acquiring a current density of each of the polyhedral elements by calculating a strength of the electric field of each of the polyhedral elements from the calculated electric potentials at the nodes or the edges, a step of acquiring a current value between the terminals of the lead conductors by integrating the acquired current densities of the polyhedral elements, and a step of calculating the initial resistance value from the acquired current value and a potential difference between the terminals of the lead conductors.

It is further preferred that the third step includes a step of assuming electric potentials on the nodes or the edges of each of the polyhedral elements as unknowns, a step of creating a matrix of a finite element method on the nodes or the edges in accordance with a weighted residual equation based on a polyhedral element volume coordinate and a resistivity of each of the polyhedral elements, a step of creating a column vector by providing a fixed boundary condition to upper surfaces of the lead conductors, and a step of solving equations of the matrix and the column vector to calculate the electric potential at each node or edge.

It Is also preferred that the third step further includes a step of acquiring a current density of each of the polyhedral elements by calculating a strength of the electric field of each of the polyhedral elements from the calculated electric potentials at the nodes or the edges, a step of acquiring a current value between the terminals of the lead conductors by integrating the acquired current densities of the polyhedral elements, and a step of calculating the resistance value from the acquired current value and a potential difference between the terminals of the lead conductors.

It is preferred that the fourth step includes a step of acquiring the reproduction track width from a characteristic representing a relationship between a position in the track width direction and a difference between the resistance value and the initial resistance value of the local block corresponding to the position.

According to the present invention, furthermore, a program for calculating a reproduction track width of an MR head, causing a computer to function as a first means for subdividing at least one layer of an MR element, magnetic domain control layers of the MR element and lead conductors connected to the MR element into a plurality of polyhedral elements, based on at least data representing a shape of the at least one layer, data representing a shape of the magnetic domain control layers and data representing a shape of the lead conductors, a second means for of calculating electric potentials at nodes or edges of each of the polyhedral elements at least based on resistivities of the at least one layer, the magnetic domain control layers and the lead conductors, acquiring a current density of each of the polyhedral elements based on the calculated electric potentials at the nodes or the edges, and integrating the acquired current densities to calculate an initial resistance value between terminals of the lead conductors, and a third means for, in a state where a resistivity of a local block of the MR element is changed by a predetermined amount, calculating electric potentials at nodes or the edges of each of the polyhedral elements, acquiring a current density of each of the polyhedral elements based on the calculated electric potentials at the nodes or the edges, and integrating the acquired current densities to calculate a resistance value between the terminals of the lead conductors, functions of the third means being repeated by shifting the local block with a resistivity changed by the predetermined amount, in a track width direction of the MR element, whereby a reproduction track width is obtained from the acquired initial resistance value and the acquired resistance value.

Further objects and advantages of the present invention will be apparent from the following description of the preferred embodiments of the invention as illustrated in the accompanying drawings.

BRIEF DESCRIPTION OF THE DRAWINGS

FIG. 6 is a perspective view used for explaining a local block in the embodiment of FIG. 1;

DETAILED DESCRIPTION OF THE PREFERRED EMBODIMENTS

Figure 1:
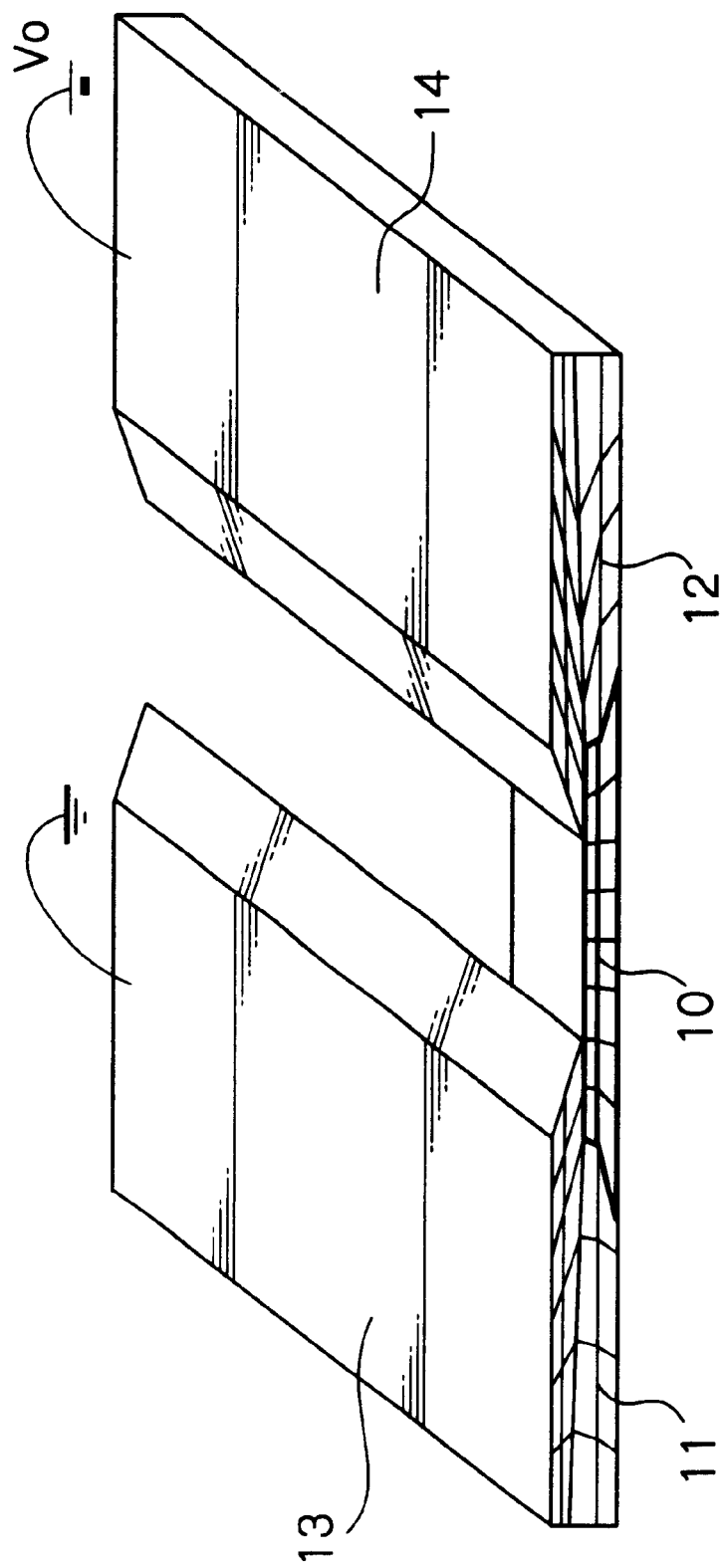
FIG. 1 is a perspective view schematically illustrating, as a preferred embodiment according to the present invention, a model for calculating electric field/current distribution of an SVMR head.
Figure 2:
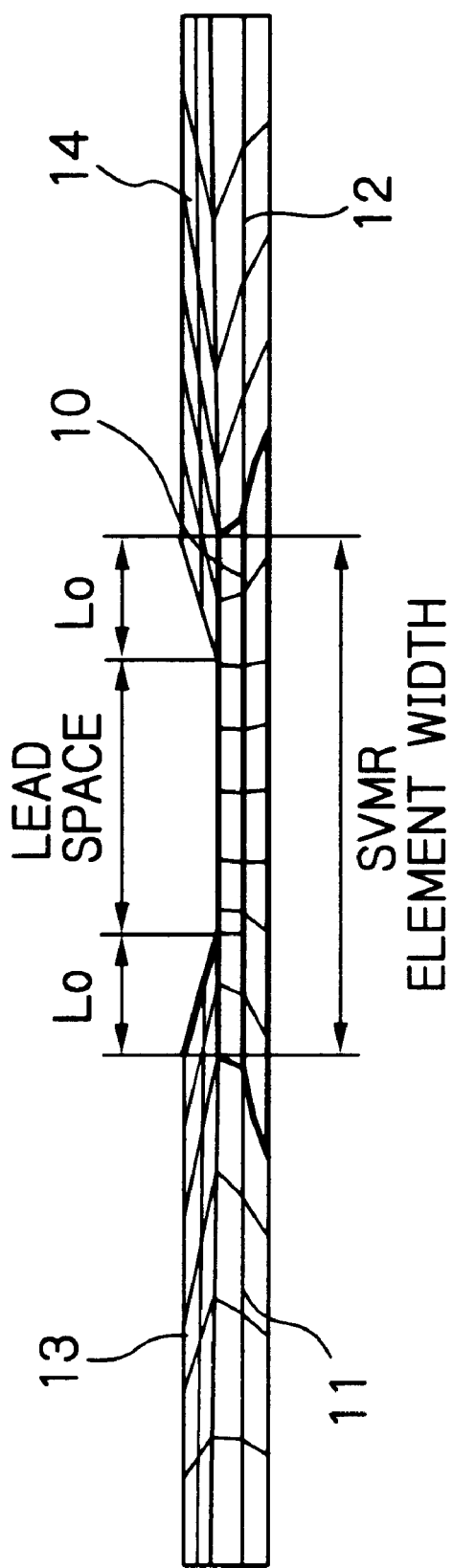
FIG. 2 is a sectional view schematically illustrating the model for calculating the electric field/current distribution of the SVMR head in the embodiment of FIG. 1.

FIGS. 1 and 2 schematically illustrate, as a preferred embodiment of the present invention, a model for calculating electric field/current distribution of an SVMR head.

In these figures, reference numeral 10 denotes an SVMR element, 11 and 12 denote first and second magnet layers provided in contact with both ends of the SVMR element 10, and 13 and 14 denote first and second lead conductors that are laminated on the first and second magnet layers 11 and 12 and further overlapping in part on a top surface of the SVMR element 10 (lead-overlaid structure).

Although not shown, the SVMR element 10 has a known multi-layered structure of an SVMR under layer, a ferromagnetic free layer (free layer), a nonmagnetic intermediate layer (nonmagnetic spacer layer), a ferromagnetic pinned layer (pinned layer), an anti-ferromagnetic layer and a cap layer.

An electrical path of this SVMR head mainly includes three components of the SVMR element, the magnet layer, and a lead conductor consisting of a lead under layer, a lead conductor layer and a lead cap layer. Each of these components is divided into a large number of polyhedral elements (tetrahedral elements or hexahedral elements), and electric potentials that are unknowns are set at vertexes (nodes) of each element. In addition, known electric potentials are set on top end surfaces of the first and second lead conductors 13 and 14, respectively. For these discrete elements, an equation is created by applying a finite element method of a stationary current. This process is described by the following equation.

A governing equation of the stationary current is as follows:

$$-div(\sigma \cdot grad\ \phi)=0 \qquad (1).$$

A weighted residual equation of Galerkin is created by using a vector complementary function $N_i$:

$$\iiint_v(-\sigma div N_i \cdot grad\phi)dv - \iint_s N_i\sigma\frac{\partial\phi}{\partial n}ds = 0 \qquad (2).$$

For instance, in case of tetrahedral elements, the residual equation of Laplace for an element m (first term of equation (2)) will be as follows, if unknown electric potentials at the nodes are $\phi_i$, $\phi_j$, $\phi_k$ and $\phi_l$.

$$\sum_m \sigma_m \cdot [(b_i^2 + c_i^2 + d_i^2)\phi_i + (b_ib_j + c_ic_j + d_id_j)\phi_j + \\ (b_ib_k + c_ic_k + d_id_k)\phi_k + (b_ib_l + c_ic_l + d_id_l)\phi_l] = 0 \qquad (3)$$

Here, a, b, c and d are values satisfying the following standardized volume coordinates $L_i$, $L_j$, $L_k$ and $L_l$ (however, $L_i+L_j+L_k+L_l=1$):

$$L_i=a_i+b_ix+c_iy+d_iz$$
$$L_j=a_j+b_jx+c_jy+d_jz$$
$$L_k=a_k+b_kx+c_ky+d_kz$$
$$L_l=a_l+b_lx+c_ly+d_lz. \qquad (4).$$

Equation (3) is created for all the elements so as to acquire a coefficient matrix for ϕ. Next, fixed boundaries (ϕ is known) are given to the top surfaces of the first and second lead conductors 13 and 14 as boundary conditions, and the following natural boundary equation (5) is given to other boundaries so that a coefficient matrix [A] and a column vector {B} are thereby completed (equation (6)):

$$\iint_s N_i\sigma\frac{\partial\phi}{\partial n}ds = 0 \qquad (5)$$

$$[A]\{\phi\}=\{B\} \qquad (6).$$

As a solution of the equation (6), the Gaussian method of elimination or the ICCG method (Incomplete Cholesky Conjugate Method) is used. An electric potential ϕ at each node can be acquired by solving the equation (6).

For each element, electric field strength E is acquired from ϕ by using the equation of E=−grad ϕ, and a current density J is further acquired by using the equation of J=σE. Lastly, resistance of the entire head is derived from a current value I acquired by integrating the electric potential and the current density between the lead conductors.

As an example, the SVMR head with a lead overlaid structure as shown in FIG. 1 is set to have, as the SVMR element 10, 4 nm thickness and 20 μΩcm resistivity of the free layer, 2 nm thickness and 15 μΩcm resistivity of the nonmagnetic spacer layer, 5 nm thickness and 30 μΩcm resistivity of the pinned layer, 15 nm thickness and 150 μΩcm resistivity of the anti-ferromagnetic layer, 3 nm thickness and 200 μΩcm resistivity of the cap layer, 30 nm thickness and 40 μΩcm resistivity of the first and second magnet layers 11 and 12, 10 nm thickness and 200 μΩcm resistivity of the lead under layer of the first and second lead conductors 13 and 14, and 50 nm thickness and 10 μΩcm resistivity of the lead conductor layer.

As shown in FIG. 2, the width of the SVMR element 10 is 0.40 μm, and the first and second lead conductors 13 and 14 are overlapping from both ends of the SVMR element by approximately 0.10 μm respectively (lead overlap length Lo is Lo=0.10 μm), and a space of the lead conductors is 0.20

μm. Height of the SVMR element 10 is 0.20 μm. In addition, a ground potential of 0V is given to the terminal of the first lead conductor 13, and a controlled potential Vo of 1V is given to the terminal of the second lead conductor 14.

Figure 3:
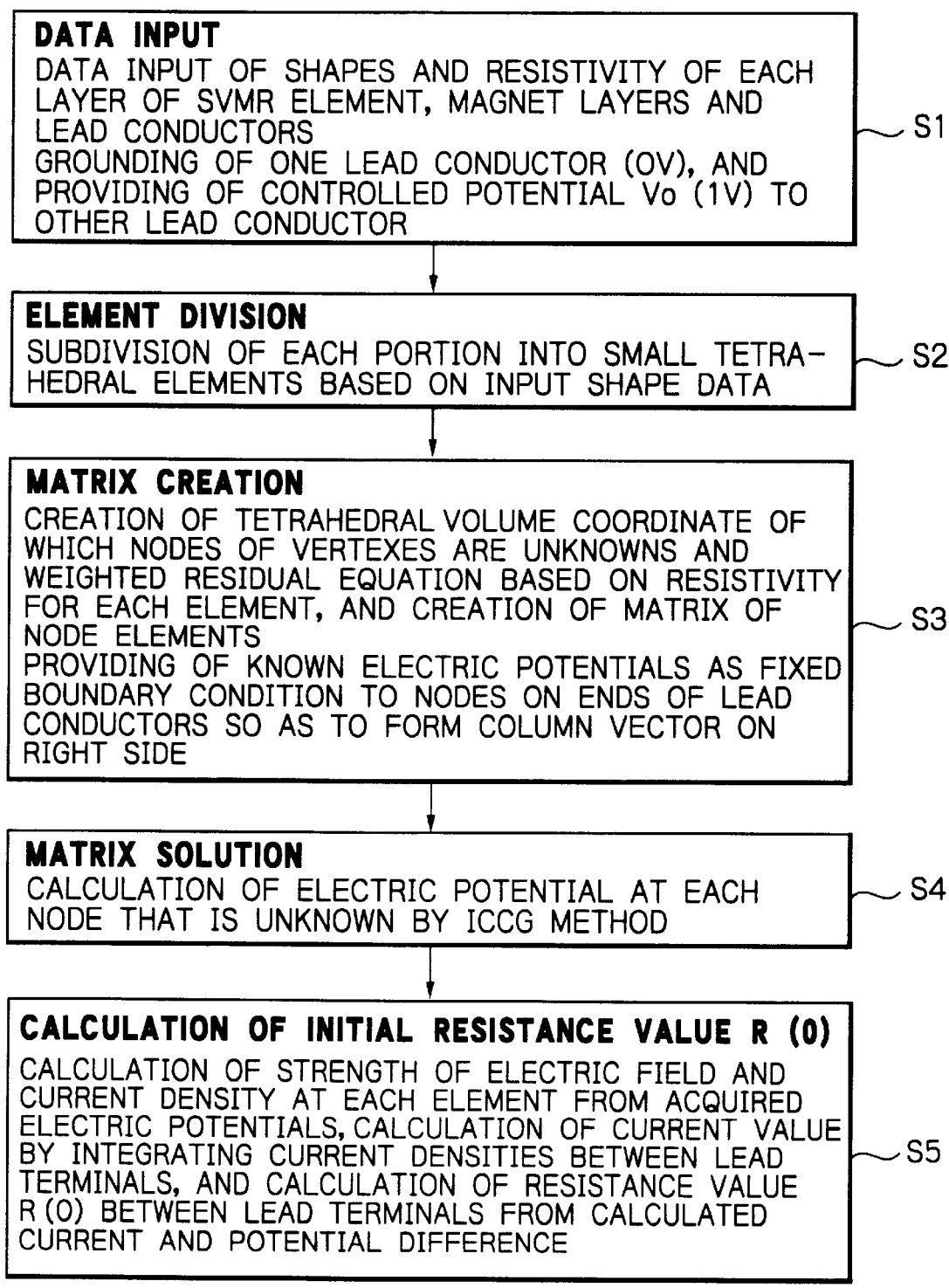
FIG. 3 is a flowchart illustrating a process for calculating an initial resistance value R (0) in the embodiment of FIG. 1.

An initial resistance value R(0) is calculated based on this condition by using a flowchart shown in FIG. 3. The flow of this initial resistance value calculation process will be described below.

First, shape data of each layer of the SVMR element 10, the first and second magnet layers 11 and 12, the first and second lead conductors 13 and 14, and resistivity data of these layers are inputted. The end of the first lead conductor 13 is grounded (0V), and the controlled potential Vo (1V) is given to the end of the second lead conductor 14 (step S1).

Next, based on the input shape data, each portion is divided into small tetrahedral elements by automatic calculation (step S2).

Next, a tetrahedral volume coordinate of which nodes of vertexes are unknowns and a weighted residual equation based on the resistivity are created for each divided element, and a matrix of node elements under a finite element method is created. Furthermore, known electric potentials are given to nodes at the ends of the lead conductors as a fixed boundary condition so as to form a column vector on the right side (step S3).

Next, as to the created matrix, an electric potential at each node that is an unknown is calculated by the ICCG method (step S4).

Figure 4:
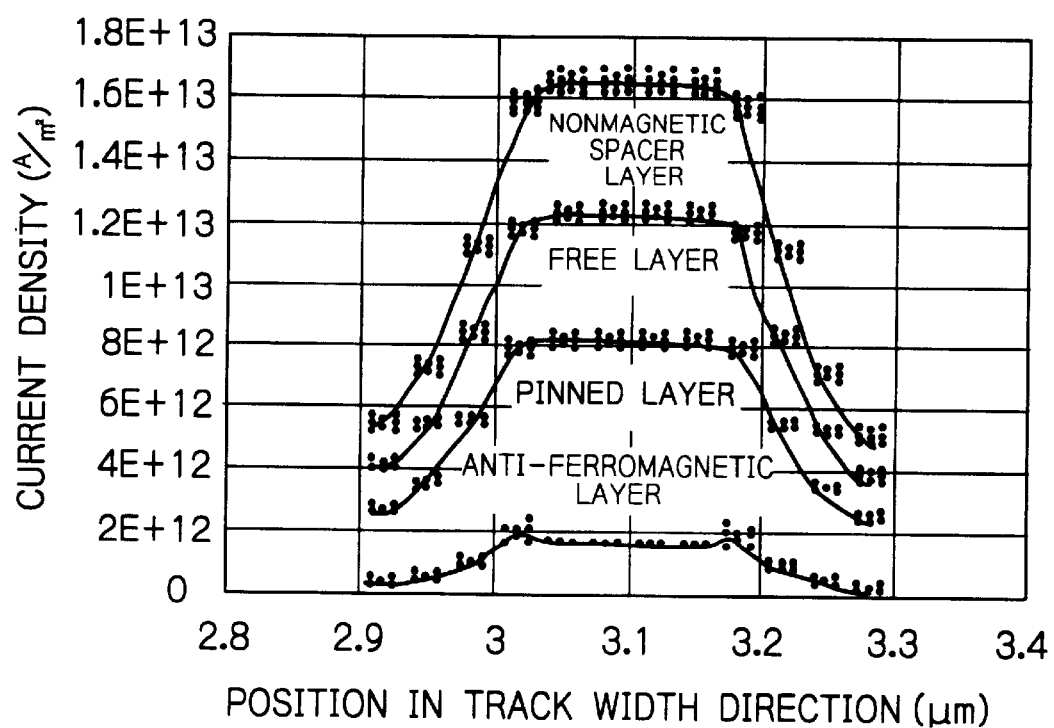
FIG. 4 is a diagram illustrating a current density distribution in each layer of an SVMR element in the embodiment of FIG. 1.

Thereafter, the strength of the electric field and the current density in each element are calculated from the acquired electric potentials, and the current value is acquired by integrating the current densities between the lead terminals. The resistance value R (0) is calculated from the acquired current value and a potential difference between the lead terminals (step S5). FIG. 4 illustrates a current density distribution in the layers of the SVMR element 10 calculated at this step S5, that is, in the free layer, the nonmagnetic spacer layer, the pinned layer and the anti-ferromagnetic layer.

Figure 5B:
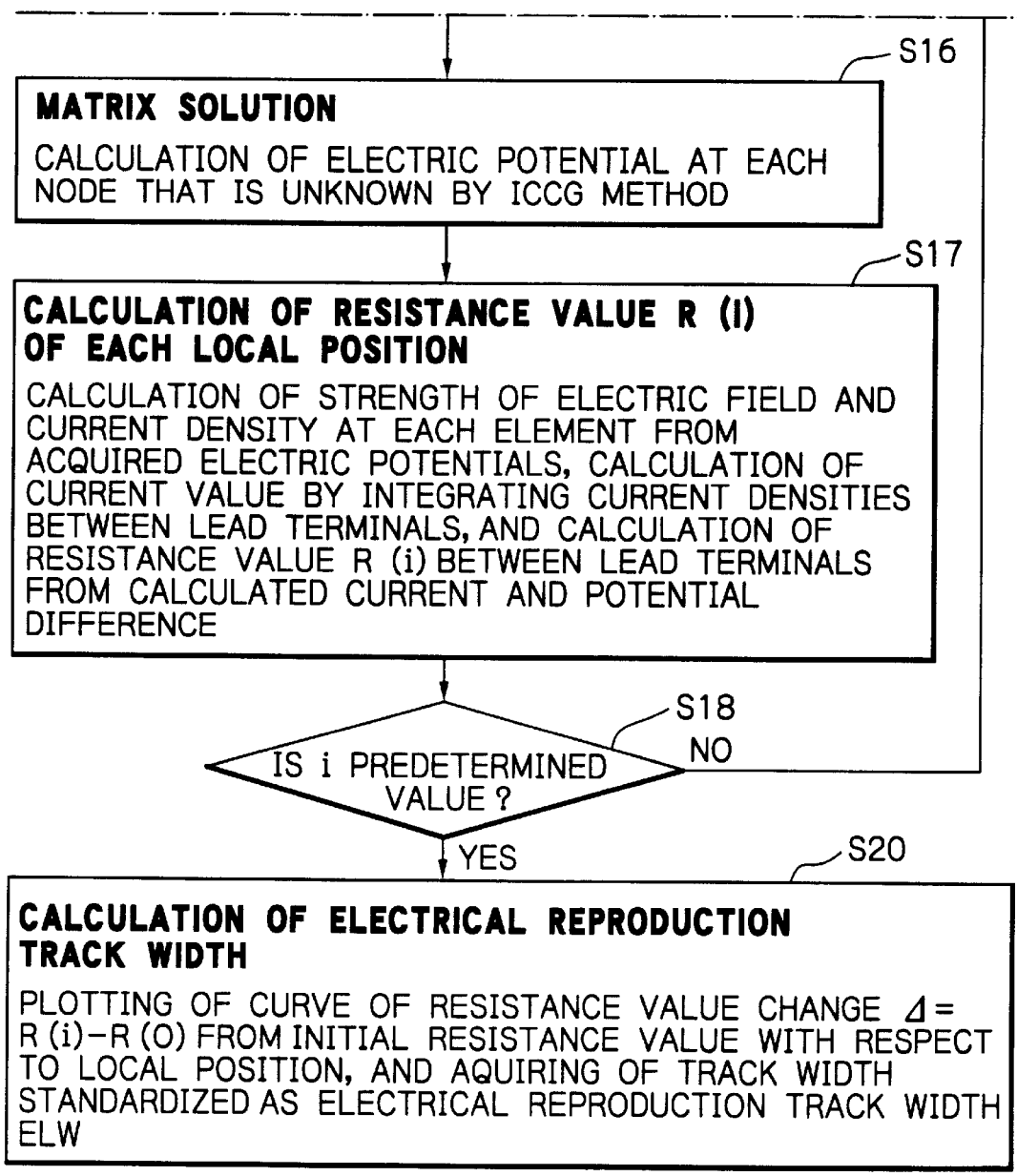
FIG. 5 combined by FIGS. 5A and 5B is a flowchart illustrating a process for calculating an electrical reproduction track width ELW in the embodiment of FIG. 1.

Next, an electrical reproduction track width ELW (ELectrical read Width) is calculated according to a flowchart shown in FIG. 5. The flow of calculation process of the electrical reproduction track width ELW will be described hereafter.

The processes of steps S11 and S12 are the same as those of steps S1 and S2 in FIG. 3, and the results thereof are temporarily stored in a computer. Accordingly, the calculation process of the electrical reproduction track width ELW is actually performed from step S13.

First, a local block number i which is set along the track width direction of the SVMR element 10 is reset at an initial value of "1" (step S13). This local block is configured by a rectangular solid wherein the free layer, the nonmagnetic spacer layer and the pinned layer of the SVMR element 10 are minutely divided. These local blocks are sequentially arranged in the track width direction as shown by reference numeral 15 in FIG. 6.

Next, the resistivity of the free layer, the nonmagnetic spacer layer and the pinned layer in this i-th local block is changed by a predetermined amount. For instance, the resistivity is increased just by 10 percent (step S14).

Then, using this resistivity for the local block i, the matrix and the column vector are created as at step S3 in FIG. 3 (step S15).

Then, as well as step S4 in FIG. 3, the matrix created in step S15 is solved by the ICCG method so as to acquire an electric potential of each node (step S16).

Next, similar to that at step S5 in FIG. 3, the resistance value R (i) between the lead terminals is calculated from the electric potentials acquired in step S16 (step S17).

Then, it is determined whether or not the local block number i has reached the predetermined value (step S18), and if it has not, the number i is incremented by one so as to shift the local block for calculation to next one along the track width direction (step S19), and it returns to step S14.

The processing from step S14 to step S17 is repeatedly performed until it is determined that the local block number i has reached the predetermined value. The resistivity is thereby changed as to all the local blocks arranged in the track width direction of the SVMR element 10, and the resistance values R (i) between the lead terminals are calculated, respectively.

Figure 7:
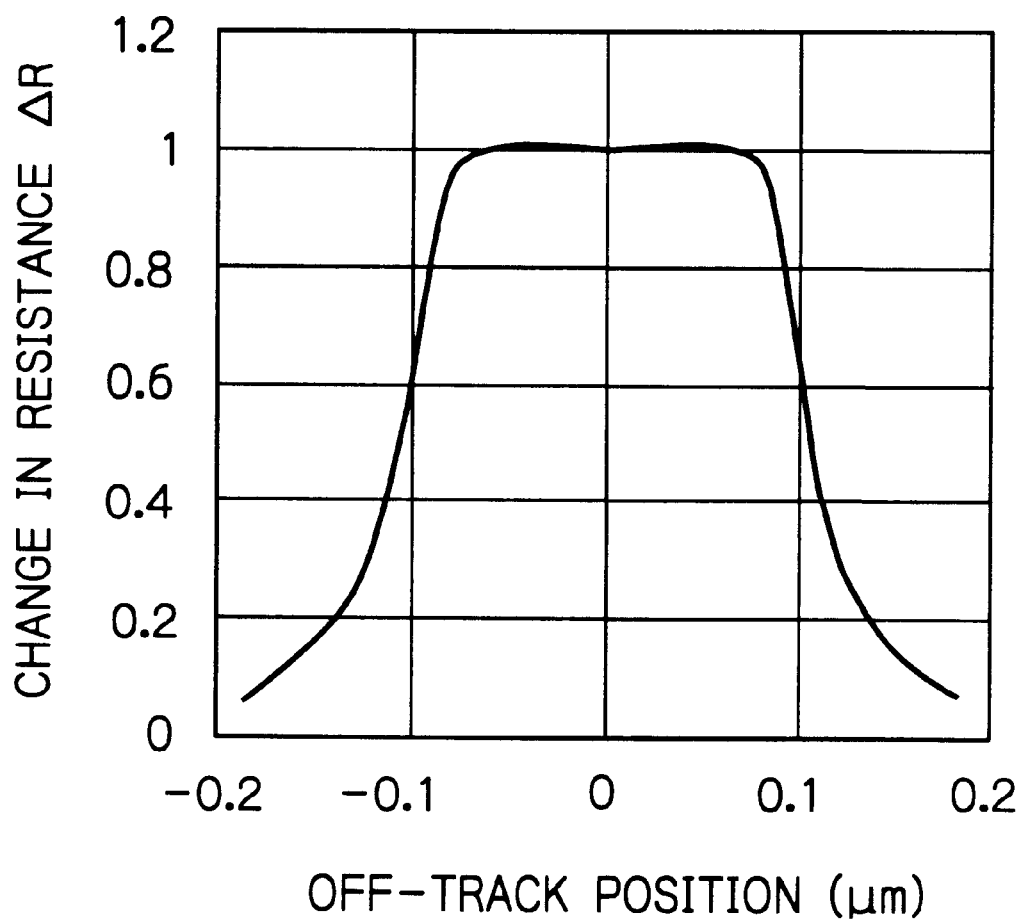
FIG. 7 is a diagram illustrating an off-track position dependency profile of change in resistance ΔR.

Thereafter, the initial resistance value R (0) is subtracted from the resistance value R (i) in each local block position thus acquired. To be more specific, change in resistance $\Delta R(i)=R(i)-R(0)$ is acquired. FIG. 7 illustrates an off-track position dependency profile of this change in resistance $\Delta R$.

Figure 8:
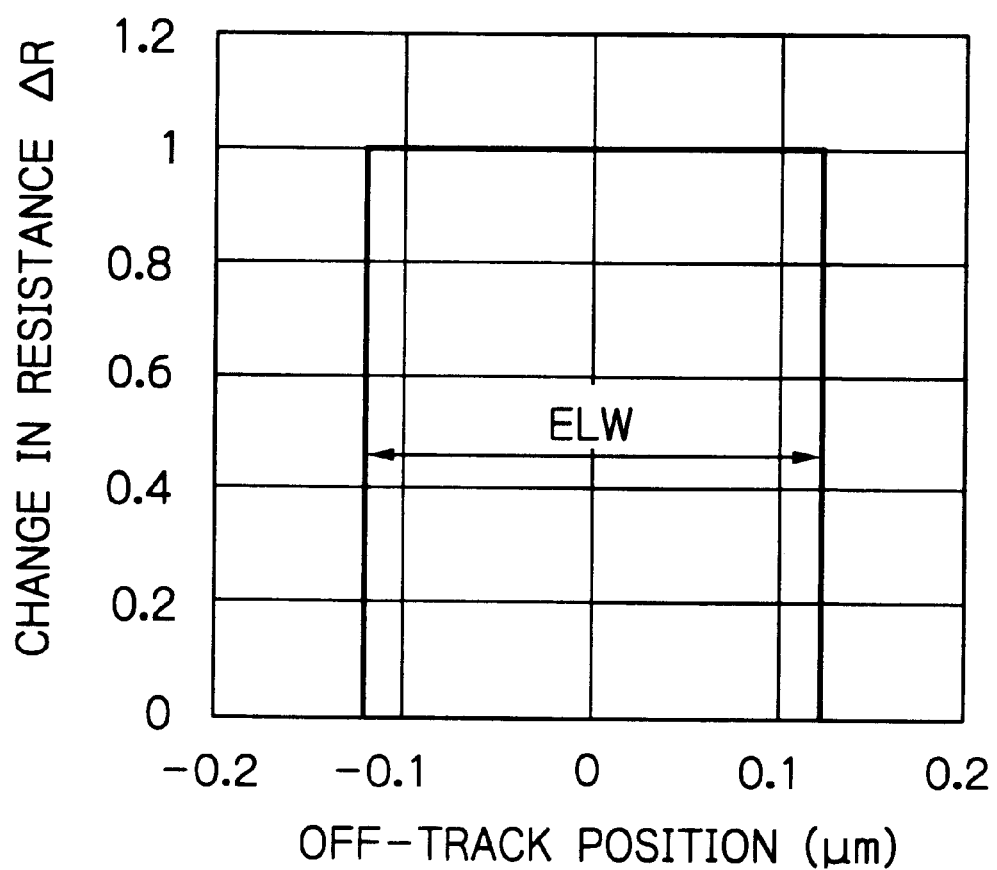
FIG. 8 is a diagram illustrating a standardized off-track position dependency profile of change in resistance ΔR.

Then, this resistance change profile curve is integrated and standardized by the maximum resistance change $\Delta R$ (=1), and a track width is acquired from the curve. This acquired track width is rendered as the electrical reproduction track width ELW (step S20). FIG. 8 illustrates the off-track position dependency profile of the standardized change in resistance $\Delta R$, and the ELW shown in the figure is equivalent to the electrical reproduction track width to be acquired.

As aforementioned, according to this embodiment, it is possible to obtain an electrical reproduction track width of the SVMR head with high accuracy by calculation. A reproduction track width inherent to a discrete SVMR head should be defined by this electrical reproduction track width ELW that never depends on a medium magnetic field nor a spacing between the SVMR head and the medium.

A substantial track width of the SVMR head when actually operating on a magnetic disk can be obtained by considering expansion of the medium magnetic field MDW that may change in accordance with a magnetic spacing between the SVMR head and the medium for example. Namely, the electrical reproduction width profile ELW (x) and the medium magnetic field profile MDW (x) are acquired by convolution calculation of the following equation:

$$\{ELW + MDW\}(X) = \int_{-\infty}^{+\infty} ELW(X) \cdot MDW(X) ds \quad (7)$$

where, X is a position coordinate in the track direction. The substantial track width (ELW+MDW) can be thus obtained from for example a half-value width of a convoluted curve of the medium magnetic field profile and the electrical reproduction width profile.

Figure 9:
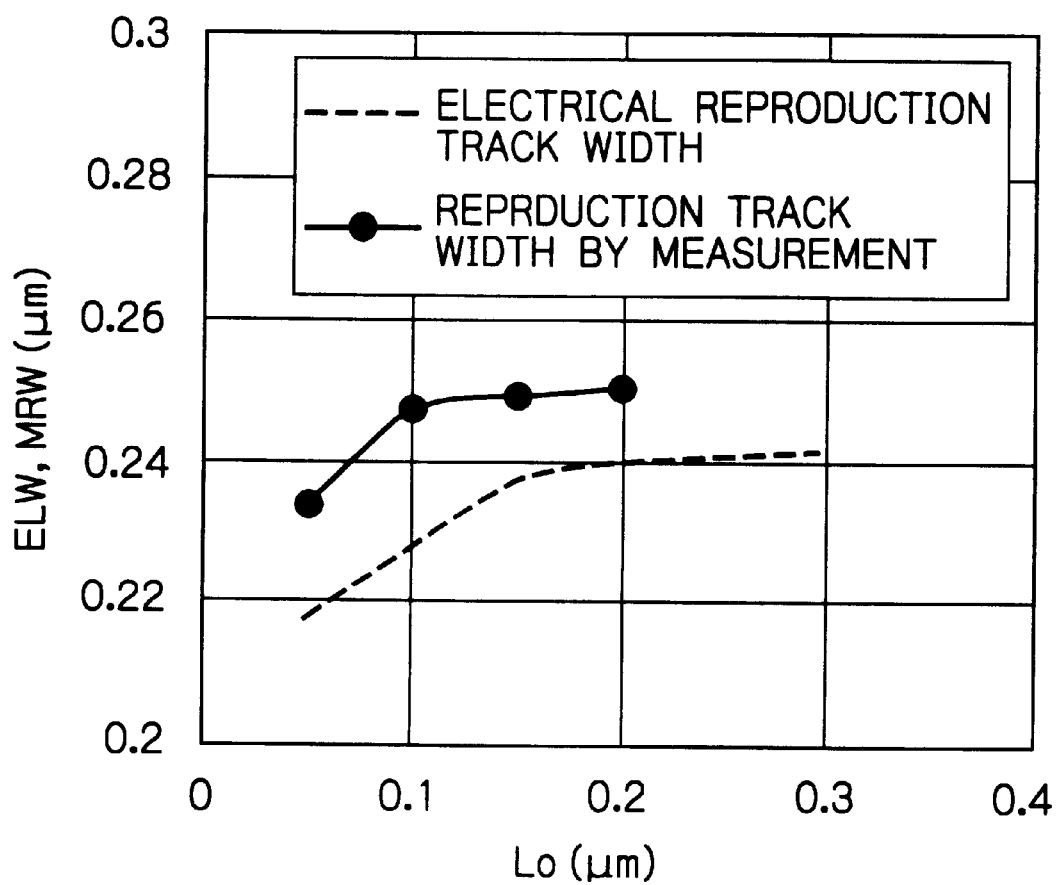
FIG. 9 is a diagram illustrating an ELW characteristic and a substantial reproduction track width MRW characteristic acquired by measuring an actually fabricated SVMR head, with respect to a calculated Lo, in another embodiment according to the present invention.

The above-mentioned embodiment is the case where the lead overlapped length Lo is fixed as Lo=0.10 μm. As for another embodiment according to the present invention, an electrical reproduction width ELW when the lead overlapped length Lo is changed is calculated by using the same method for the same SVMR head of a lead-overlaid structure with an electrode spacing of 0.20 μm. The conditions other than Lo are the same as those in the former embodiment. FIG. 9 illustrates thus calculated ELW with respect to Lo and also a substantial reproduction track width MRW acquired by measuring a SVMR head actually created. While the changes of the ELW and the MRW against the increase in Lo show similar tendencies, their values are mutually different. This is because the aforementioned expansion of the medium magnetic field MDW is not taken into consideration.

Figure 10:
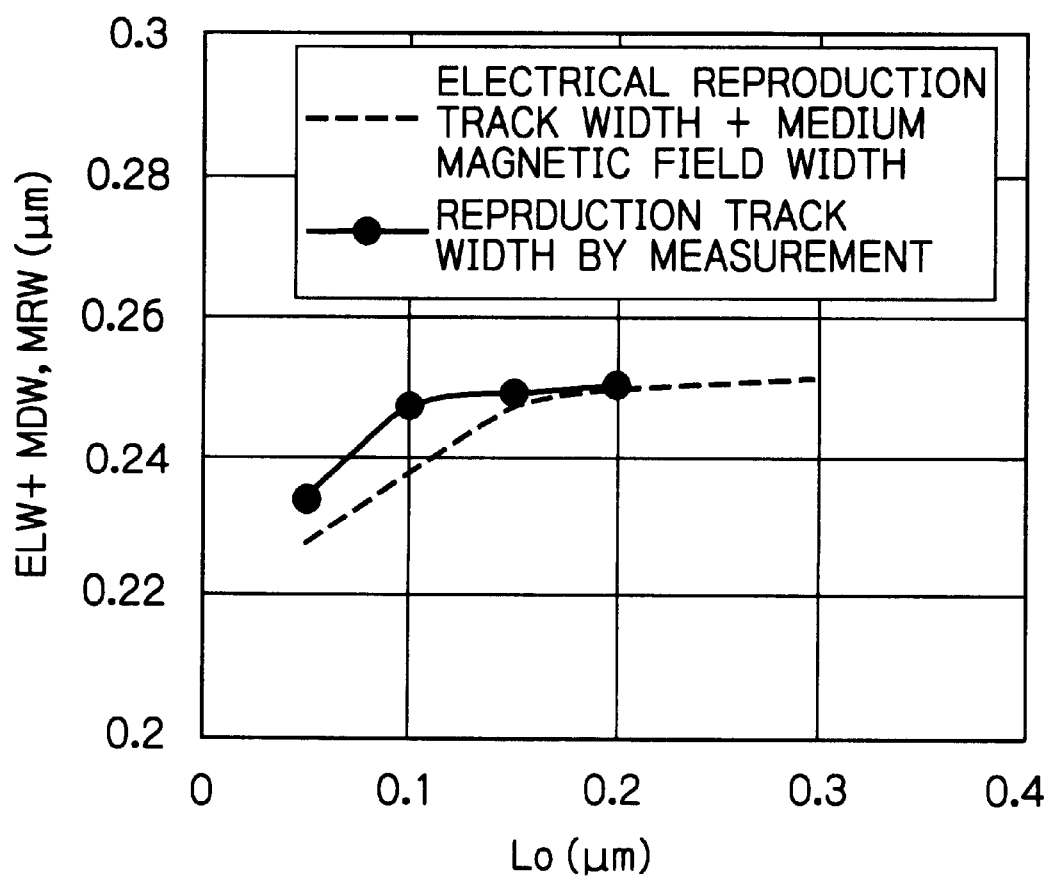
FIG. 10 is a diagram illustrating the ELW characteristic considering a medium magnetic field and the substantial reproduction track width MRW characteristic acquired by measuring the actually fabricated SVMR head, with respect to a calculated Lo.

Thus, FIG. 10 illustrates the case where the medium magnetic field profile and the electrical reproduction width profile are convoluted by the aforementioned equation (7), and the consequently acquired half-value width is rendered as (ELW+MDW) and plotted with respect to Lo. This value coincides well with an experimental value, and the actual reproduction track width is well represented by the electrical reproduction track width and expansion width of the medium magnetic field. As previously mentioned, however, this expansion of the medium magnetic field is the amount changeable depending on the magnetic spacing between the SVMR head and the medium, and therefore the reproduction track width inherent to a discrete SVMR head should be defined by the electrical reproduction track width.

In the aforementioned embodiments, the electric potentials are calculated at nodes of each element. However, it is possible to calculate the electric potentials at edges of each element instead of these at the nodes. Also, although a substantial track width of the SVMR element is calculated in the aforementioned embodiments, it is apparent that the present invention can be applied to the cases where substantial track widths of GMR elements, other multi-layered MR elements or AMR elements other than the SVMR element are to be calculated.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for calculating a reproduction track width of a magnetoresistive effect head, comprising:
   a first step of subdividing at least one layer of a magnetoresistive effect element, magnetic domain control layers of said magnetoresistive effect element and lead conductors connected to said magnetoresistive effect element into a plurality of polyhedral elements, based on at least data representing a shape of said at least one layer, data representing a shape of said magnetic domain control layers and data representing a shape of said lead conductors;
   a second step of calculating electric potentials at nodes or edges of each of said polyhedral elements at least based on resistivities of said at least one layer, said magnetic domain control layers and said lead conductors, acquiring a current density of each of said polyhedral elements based on the calculated electric potentials at the nodes or the edges, and integrating the acquired current densities to calculate an initial resistance value between terminals of said lead conductors;
   a third step of, in a state where a resistivity of a local block of said magnetoresistive effect element is changed by a predetermined amount, calculating electric potentials at nodes or the edges of each of said polyhedral elements, acquiring a current density of each of said polyhedral elements based on the calculated electric potentials at the nodes or the edges, and integrating the acquired current densities to calculate a resistance value between the terminals of said lead conductors, said third step being repeated by shifting said local block with a resistivity changed by the predetermined amount, in a track width direction of said magnetoresistive effect element; and
   a fourth step of obtaining a reproduction track width from said acquired initial resistance value and said acquired resistance value.

2. The method as claimed in claim 1, wherein said second step comprises a step of assuming electric potentials on the nodes or the edges of each of said polyhedral elements as unknowns, a step of creating a matrix of a finite element method on the nodes or the edges in accordance with a weighted residual equation based on a polyhedral element volume coordinate and a resistivity of each of the polyhedral elements, a step of creating a column vector by providing a fixed boundary condition to upper surfaces of said lead conductors, and a step of solving equations of the matrix and the column vector to calculate the electric potential at each node or edge.

3. The method as claimed in claim 2, wherein said second step further comprises a step of acquiring a current density of each of the polyhedral elements by calculating a strength of the electric field of each of the polyhedral elements from the calculated electric potentials at the nodes or the edges, a step of acquiring a current value between the terminals of said lead conductors by integrating the acquired current densities of the polyhedral elements, and a step of calculating said initial resistance value from the acquired current value and a potential difference between the terminals of said lead conductors.

4. The method as claimed in claim 1, wherein said third step comprises a step of assuming electric potentials on the nodes or the edges of each of said polyhedral elements as unknowns, a step of creating a matrix of a finite element method on the nodes or the edges in accordance with a weighted residual equation based on a polyhedral element volume coordinate and a resistivity of each of the polyhedral elements, a step of creating a column vector by providing a fixed boundary condition to upper surfaces of said lead conductors, and a step of solving equations of the matrix and the column vector to calculate the electric potential at each node or edge.

5. The method as claimed in claim 4, wherein said third step further comprises a step of acquiring a current density of each of the polyhedral elements by calculating a strength of the electric field of each of the polyhedral elements from the calculated electric potentials at the nodes or the edges, a step of acquiring a current value between the terminals of said lead conductors by integrating the acquired current densities of the polyhedral elements, and a step of calculating said resistance value from the acquired current value and a potential difference between the terminals of said lead conductors.

6. The method as claimed in claim 1, wherein said fourth step comprises a step of acquiring the reproduction track width from a characteristic representing a relationship between a position in the track width direction and a difference between said resistance value and said initial resistance value of said local block corresponding to the position.

7. A program for calculating a reproduction track width of a magnetoresistive effect head, causing a computer to function as:
   a first means for subdividing at least one layer of a magnetoresistive effect element, magnetic domain control layers of said magnetoresistive effect element and lead conductors connected to said magnetoresistive effect element into a plurality of polyhedral elements, based on at least data representing a shape of said at least one layer, data representing a shape of said magnetic domain control layers and data representing a shape of said lead conductors;

a second means for of calculating electric potentials at nodes or edges of each of said polyhedral elements at least based on resistivities of said at least one layer, said magnetic domain control layers and said lead conductors, acquiring a current density of each of said polyhedral elements based on the calculated electric potentials at the nodes or the edges, and integrating the acquired current densities to calculate an initial resistance value between terminals of said lead conductors; and a third means for, in a state where a resistivity of a local block of said magnetoresistive effect element is changed by a predetermined amount, calculating electric potentials at nodes or the edges of each of said polyhedral elements, acquiring a current density of each of said polyhedral elements based on the calculated electric potentials at the nodes or the edges, and integrating the acquired current densities to calculate a resistance value between the terminals of said lead conductors, functions of said third means being repeated by shifting said local block with a resistivity changed by the predetermined amount, in a track width direction of said magnetoresistive effect element, whereby a reproduction track width is obtained from said acquired initial resistance value and said acquired resistance value.

* * * * *